United States Patent
Jones et al.

(10) Patent No.: US 9,732,661 B2
(45) Date of Patent: Aug. 15, 2017

(54) VEHICLE WATER JACKET

(71) Applicant: JAGUAR LAND ROVER LIMITED, Warwickshire (GB)

(72) Inventors: Steve Jones, Coventry (GB); Steven Pierson, Coventry (GB); Kevin French, Conventry (GB); Chris McNab, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 7 days.

(21) Appl. No.: 14/905,989

(22) PCT Filed: Jul. 22, 2014

(86) PCT No.: PCT/EP2014/065742
§ 371 (c)(1),
(2) Date: Jan. 19, 2016

(87) PCT Pub. No.: WO2015/014674
PCT Pub. Date: Feb. 5, 2015

(65) Prior Publication Data
US 2016/0153344 A1   Jun. 2, 2016

(30) Foreign Application Priority Data

Jul. 29, 2013   (GB) .................................. 1313450.7

(51) Int. Cl.
*F01P 7/14* (2006.01)
*F02F 1/24* (2006.01)
(Continued)

(52) U.S. Cl.
CPC ................. *F01P 7/14* (2013.01); *B60H 1/04* (2013.01); *F01P 3/02* (2013.01); *F01P 3/14* (2013.01);
(Continued)

(58) Field of Classification Search
CPC ........ F01P 7/14; F01P 3/02; F01P 3/16; F01P 3/14; F01P 2007/146; F01P 2003/021; B60H 1/04; F02F 1/242; F02F 1/40
See application file for complete search history.

(56) References Cited

U.S. PATENT DOCUMENTS 6,279,516 B1   8/2001   Haugen et al.
6,732,679 B2 *   5/2004   Iizuka ...................... F01P 7/16
123/41.1
(Continued)

FOREIGN PATENT DOCUMENTS

EP   1126152 A2   8/2001
EP   2497931 A1   9/2012
(Continued)

OTHER PUBLICATIONS

International Search Report and Written Opinion of the International Searching Authority for International application No. PCT/EP2014/065742 dated Sep. 18, 2014.
(Continued)

*Primary Examiner* — Hung Q Nguyen
(74) *Attorney, Agent, or Firm* — Carlson, Gaskey & Olds

(57) ABSTRACT

A vehicle water jacket assembly includes a first water jacket portion establishing a plurality of first fluid channels that are situated to facilitate fluid movement along at least a first plane. A second water jacket portion is situated near the first water jacket portion. The second water jacket portion establishes a plurality of second fluid channels that are situated to facilitate fluid movement along at least a second plane that is generally parallel to the first plane. At least one connector portion establishes a plurality of connector fluid channels that are situated to facilitate fluid movement between at least
(Continued)

one of the first fluid channels and at least one of the second fluid channels along a direction that is transverse to the first and second planes.

13 Claims, 2 Drawing Sheets

(51) Int. Cl.
    *F02F 1/40*     (2006.01)
    *B60H 1/04*     (2006.01)
    *F01P 3/02*     (2006.01)
    *F01P 3/14*     (2006.01)
    *F01P 3/16*     (2006.01)

(52) U.S. Cl.
    CPC ............... *F01P 3/16* (2013.01); *F02F 1/242* (2013.01); *F02F 1/40* (2013.01); *F01P 2003/021* (2013.01); *F01P 2007/146* (2013.01)

(56) References Cited

U.S. PATENT DOCUMENTS

| | | |
|---|---|---|
| 2009/0133647 A1 | 5/2009 | Yamagata |
| 2010/0089343 A1 | 4/2010 | Hamada |
| 2011/0277708 A1 | 11/2011 | Geiser et al. |
| 2011/0315098 A1 | 12/2011 | Kosugi et al. |
| 2012/0012073 A1 | 1/2012 | Brewer et al. |
| 2012/0210954 A1 | 8/2012 | Nishikawa et al. |

FOREIGN PATENT DOCUMENTS

| | | |
|---|---|---|
| FR | 2682994 A1 | 4/1993 |
| GB | 1593073 | 12/1977 |
| JP | 62-79927 U | 5/1987 |
| JP | 2000-220451 | 8/2000 |
| JP | 2012036815 A | 2/2012 |
| JP | 2012-107573 | 6/2012 |
| WO | 2008122544 A1 | 10/2008 |
| WO | 2011163633 A2 | 12/2011 |

OTHER PUBLICATIONS

Combined Search and Examination Report under Sections 17 and 18(3) for Application No. GB1313450.7 dated Feb. 27, 2014.

* cited by examiner

VEHICLE WATER JACKET

TECHNICAL FIELD

The subject matter of this description generally relates to managing vehicle engine temperatures. More particularly, but not exclusively, the subject matter of this description relates to a vehicle water jacket configuration.

BACKGROUND

Internal combustion engine components are exposed to very high temperatures and often are required to withstand very high pressures. The desire for enhanced engine performance brings with it new challenges associated with configuring engine components. For example, achieving higher in-cylinder peak gas pressures requires even more pressure-capable components. If better fuel economy is also desired, that makes the challenge even more significant. Smaller, lighter weight engine components can provide enhanced fuel economy. The challenge, however, is how to make such engine components smaller or lighter while maintaining sufficient strength and durability to withstand the temperatures and pressures associated with engine operation.

SUMMARY

According to an embodiment, an assembly includes a first water jacket portion establishing a plurality of first fluid channels that are situated to facilitate fluid movement along at least a first plane. A second water jacket portion is situated near the first water jacket portion. The second water jacket portion establishes a plurality of second fluid channels that are situated to facilitate fluid movement along at least a second plane that is generally parallel to the first plane. At least one connector portion establishes a plurality of connector fluid channels that are situated to facilitate fluid movement between at least one of the first fluid channels and at least one of the second fluid channels along a direction that is transverse to the first and second planes.

In an assembly having one or more features of the preceding paragraph, the first and second water jacket portions are configured to be situated in a generally horizontal orientation and the connector fluid channels are configured to be situated in a generally vertical orientation.

An assembly having one or more features of either of the preceding paragraphs includes an inlet to the first water jacket portion on a first side of the first water jacket portion and an outlet from the second water jacket portion on the first side of the first water jacket portion.

In such an assembly the first fluid channels are configured to carry at least some of the fluid in a direction from the first side of the first water jacket portion toward a second, opposite side of the first water jacket portion; the connector fluid channels are configured to carry the at least some of the fluid from the first fluid channels to the second fluid channels; and the second fluid channels are configured to carry the at least some of the fluid received from the connector fluid channels in another direction from the second side toward the first side and toward the outlet.

An assembly having one or more features of any of the preceding paragraphs includes an engine cylinder block and wherein the first water jacket portion includes a cylinder block outlet for directing some fluid from the first fluid channels toward the engine cylinder block.

An assembly having one or more features of any of the preceding paragraphs includes a vehicle cabin heater and wherein the outlet from the second water jacket portion directs the at least some of the fluid toward the vehicle cabin heater.

An assembly having one or more features of any of the preceding paragraphs includes a flow control element that is selectively controllable to prioritize fluid flow through the cylinder block outlet when warming engine oil is desired; and prioritize fluid flow through the outlet from the second water jacket portion when warming the vehicle cabin heater is desired.

An assembly having one or more features of any of the preceding paragraphs includes a reinforcing plate situated at least partially between the first water jacket portion and the second water jacket portion.

An assembly having one or more features of any of the preceding paragraphs includes an engine cylinder block including a plurality of cylinders and a corresponding plurality of injectors associated with the cylinders. In such an assembly the first water jacket portion includes injector port sections adjacent the injectors to facilitate heat transfer from the injectors to fluid in corresponding injector port sections of the first fluid channels; and at least some of the connector fluid channels are situated near the injector port sections to carry heated fluid from the injector port sections to the second water jacket portion to facilitate further heat transfer from the injectors to the fluid.

An assembly having one or more features of any of the preceding paragraphs includes an engine cylinder block including a plurality of cylinders. In such an assembly the first water jacket portion is situated a first proximity to the engine cylinder block to facilitate a first amount of heat dissipation based on heat transfer from the engine cylinder block to fluid in the first fluid channels; and the second water jacket portion is situated a second proximity that is further from the engine cylinder block than the first proximity to facilitate a second, additional amount of heat dissipation based on heat transfer from the fluid in the second fluid channels to a material of the second water jacket portion.

In an assembly having one or more features of any of the preceding paragraphs the first and second water jacket portions comprise aluminum.

In an assembly having one or more features of any of the preceding paragraphs the first fluid channels are configured to direct fluid in a first direction along the first plane; and the second fluid channels are configured to direct fluid in a second, opposite direction along the second plane.

In an assembly having one or more features of any of the preceding paragraphs the first water jacket portion includes an area that is situated where coolant may not readily flow from the area; and at least one of the connector fluid channels is situated near the area to carry coolant from the area to the second water jacket portion.

In an assembly having one or more features of any of the preceding paragraphs the area is near at least one of an injector or an exhaust valve.

An example embodiment of a vehicle includes one or more features of the assembly of any of the preceding paragraphs.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, which can be briefly described as follows.

DETAILED DESCRIPTION

Figure 1:
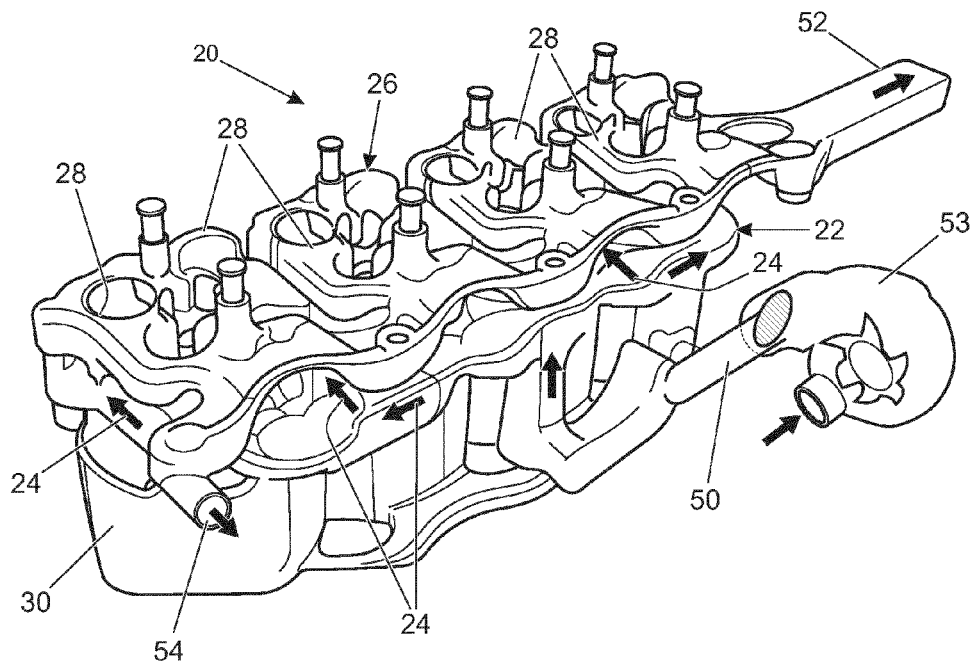
FIG. 1 is a diagrammatic, perspective illustration of a water jacket configuration designed according to an embodiment of this invention.
Figure 2:
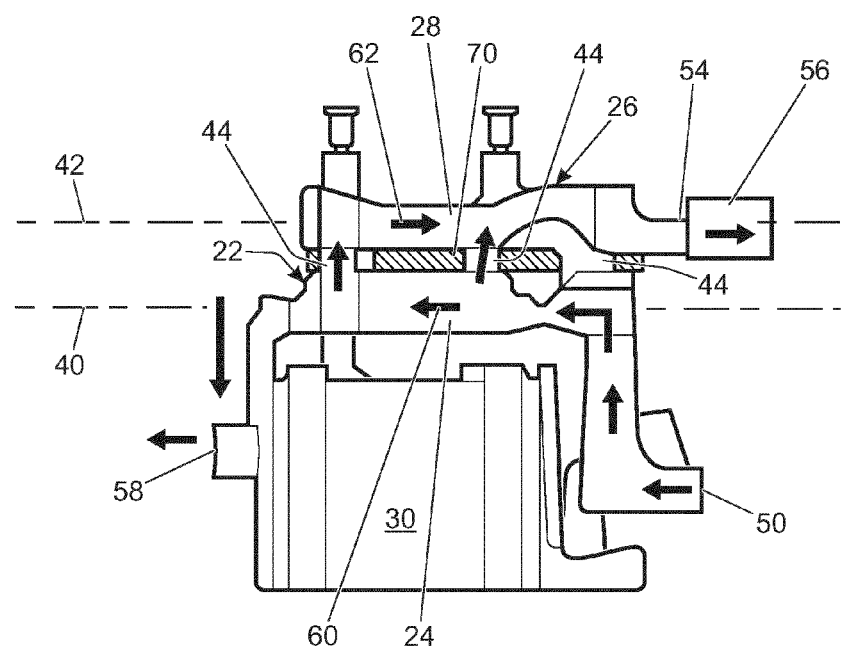
FIG. 2 is a side view that illustrates selected features of the water jacket configuration of FIG. 1.

FIGS. 1 and 2 show a water jacket assembly 20. A first water jacket portion 22 establishes a plurality of first fluid channels 24. A second water jacket portion 26 establishes a plurality of second fluid channels 28. The water jacket assembly 20 is associated with a vehicle engine cylinder block 30 that includes a plurality of cylinders in a known manner. Only selected portions of the engine cylinder block 30 are shown for discussion purposes.

The first water jacket portion 22 is situated at a first proximity relative to the engine cylinder block 30. The second water jacket portion 26 is spaced from the first water jacket portion and situated at a second proximity to the engine cylinder block 30. The first proximity is closer to at least some of the cylinder block 30 than the second proximity of the second water jacket portion 26. Having two water jacket portions separated and at different relative locations relative to the engine cylinder block can facilitate better cooling capacity, which can contribute to allowing the water jacket assembly withstanding relatively higher temperatures and pressures associated with engine operation.

The first water jacket portion is situated so that the first fluid channels 24 facilitate movement of a fluid such as coolant in at least one direction along a first plane 40. The second water jacket portion is situated so that the second fluid channels 28 facilitate fluid movement along a second plane 42 that is generally parallel to the first plane. A connector portion between the first jacket portion 22 and the second jacket portion 26 establishes a plurality of connector fluid channels 44 that allow fluid to flow between the first fluid channels 24 and the second fluid channels 28. The connector fluid channels 44 are transverse to the first plane 40 and the second plane 42. In the example of FIG. 2, the first water jacket portion, the first plane 40, the second water jacket portion 26 and the second plane 42 are all in a horizontal orientation. The connector fluid channels 44 are in a vertical orientation. Although the transverse orientation of FIG. 2 includes the connector fluid channels 44 generally perpendicular to the planes 40 and 42 other embodiments include an oblique angle of orientation between the connector fluid channels 44 and the planes 40 and 42.

The first jacket portion 22 in this example includes an inlet 50 situated on one side of the first jacket portion 22. The second jacket portion 26 includes an outlet 52 that is situated on or near the one side of the first jacket portion. Having the outlet 52 situated on the same side of the first jacket portion 22 as the inlet 50 allows for returning fluid from the second jacket portion 26 to a thermostat (not illustrated) associated with an inlet pump 53. This arrangement eliminates a need for long hoses otherwise associated with having the inlet 50 and the outlet 52 on opposite sides of a water jacket. The shorter hose length reduces the circuit coolant volume, reduces the overall envelope required to accommodate the water jacket assembly and provides improvements in the thermal inertia of the system.

The example second water jacket portion 26 includes another outlet 54 configured to deliver fluid toward a cabin heater (not illustrated). As schematically shown in FIG. 2, a flow control element 56, such as a controllable valve, may be used to control how much of the heated fluid from the second water jacket 28 is provided to the cabin heater.

The first water jacket portion 22 includes an engine cylinder block outlet 58 configured to direct fluid from the first water jacket portion to the engine cylinder block 30. Depending on the situation, it is possible to prioritize directing more of the coolant fluid through the outlet 58 to more quickly heat up engine oil or to prioritize directing more coolant fluid through the outlet 54 to more quickly heat up a vehicle cabin. The multiple jacket portions and the various outlets associated with the illustrated configuration facilitate more flexibility in achieving such desired functions or features.

As best appreciated from FIG. 2, the first water jacket portion 22 facilitates fluid movement in a first direction 60 along the first plane 40. At least some of the fluid moves through the connector fluid channels 44 and into the second water jacket portion 26. Within the second fluid channels 28, the fluid moves in a second, opposite direction 62 along the second plane 42. Such a multiple-pass movement of fluid provides enhanced cooling capacity compared to single pass arrangements and facilitates providing inlets and outlets in more functionally efficient locations as described above.

The two jacket portions 22 and 26 of the illustrated embodiment increase the coolant jacket to metal surface, which results in better heat extraction from the metal. This aspect serves to increase the fluid warm-up when starting the engine from cold. The increased coolant jacket to metal surface also reduces metal temperatures under high load, which enhances the durability limit of the cylinder block 30. Having multiple jacket portions with increased heat dissipation capacity also facilitates making the jacket assembly 20 from a lighter weight material, such as aluminum. The illustrated embodiment includes a reinforcing plate 70 at least partially received between the first water jacket portion 22 and the second water jacket portion 26 to provide structural reinforcement to the water jacket assembly 20.

Figure 3:
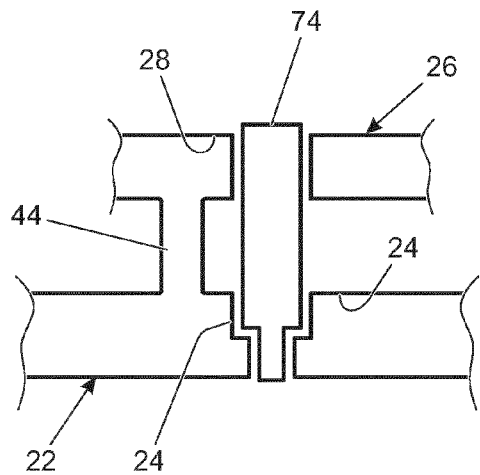
FIG. 3 is a schematic illustration showing a feature of an example embodiment of this invention.

Another feature associated with the multiple water jacket portions is shown schematically in FIG. 3. Each of the cylinders of the engine cylinder block 30 has an associated injector 74. The heat build-up in the vicinity of the injector 74 is significant and generally centrally located within the engine cylinder block 30. The first fluid channels 24 include sections adjacent the injector 74 to facilitate heat transfer from the engine cylinder block 30 and the injector 74 to the fluid within the first water jacket portion 22. The connector fluid channels 44 include at least one channel near the injector 74 so that fluid from the adjacent section of a first fluid channel 24 can move through the connector fluid channel 44 and into the second water jacket portion 26. This allows for additional heat transfer from a location on the engine that experiences high temperatures, such as the center of the combustion chamber. In this example, the second fluid channels 28 include a section adjacent the injector 74 (and any nearby portion of the engine cylinder block 30) for facilitating additional heat transfer.

Figure 4:
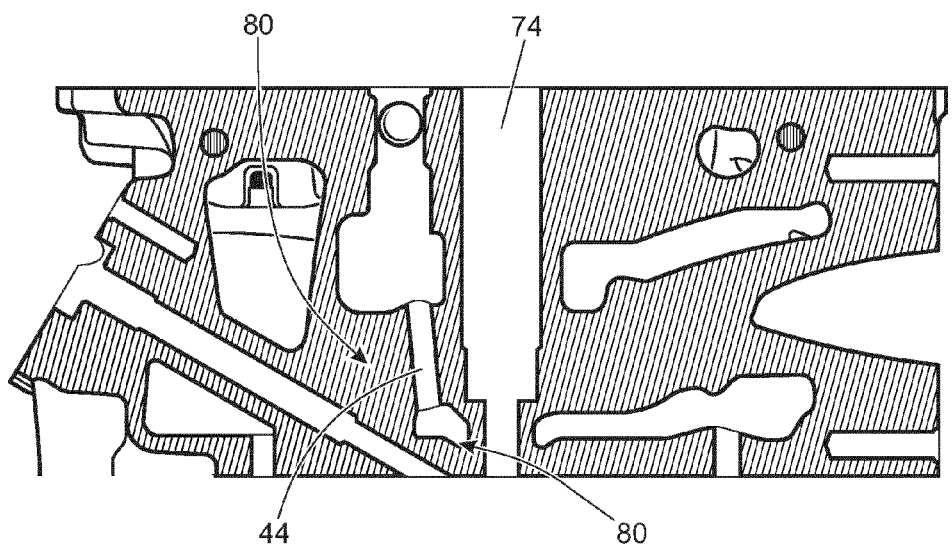
FIG. 4 is a section view illustrating certain embodiments in detail.

As shown in FIG. 4 one embodiment includes at least one connector fluid channel 44 in or near an area 80 that may be considered a stagnant water flow region surrounding one or more exhaust valves. Introducing additional water flow in such areas 80 allows for enhanced cooling effects.

The features of the illustrated example embodiment provide enhanced cooling capability and coolant distribution while facilitating using less material or lighter weight material for a water jacket assembly. Additionally, the illustrated embodiment is well-suited for withstanding higher engine temperatures and pressures compared to other designs.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

Non-limiting aspects of one or more embodiments of the invention will also be understood with reference to the following numbered paragraphs:

1. An assembly, comprising
    a first water jacket portion establishing a plurality of first fluid channels that are situated to facilitate fluid movement along at least a first plane;
    a second water jacket portion situated near the first water jacket portion, the second water jacket portion establishing a plurality of second fluid channels that are situated to facilitate fluid movement along at least a second plane that is generally parallel to the first plane; and
    at least one connector portion establishing a plurality of connector fluid channels that are situated to facilitate fluid movement between at least one of the first fluid channels and at least one of the second fluid channels along a direction that is transverse to the first and second plane.
2. The assembly of paragraph 1, wherein the first and second water jacket portions are configured to be situated in a generally horizontal orientation and the connector fluid channels are configured to be situated in a generally vertical orientation.
3. The assembly of paragraph 1, comprising
    an inlet to the first water jacket portion on a first side of the first water jacket portion; and
    an outlet from the second water jacket portion on the first side of the first water jacket portion;
    and wherein
    the first fluid channels are configured to carry at least some of the fluid in a direction from the first side of the first water jacket portion toward a second, opposite side of the first water jacket portion;
    the connector fluid channels are configured to carry the at least some of the fluid from the first fluid channels to the second fluid channels; and
    the second fluid channels are configured to carry the at least some of the fluid received from the connector fluid channels in another direction from the second side toward the first side and toward the outlet.
4. The assembly of paragraph 3, comprising an engine cylinder block and wherein the first water jacket portion includes a cylinder block outlet for directing some fluid from the first fluid channels toward the engine cylinder block.
5. The assembly of paragraph 4, comprising a vehicle cabin heater and wherein the outlet from the second water jacket portion directs the at least some of the fluid toward the vehicle cabin heater.
6. The assembly of paragraph 5, comprising a flow control element that is selectively controllable to
    prioritize fluid flow through the cylinder block outlet when warming engine oil is desired; and
    prioritize fluid flow through the outlet from the second water jacket portion when warming the vehicle cabin heater is desired.
7. The assembly of paragraph 1, comprising a reinforcing plate situated at least partially between the first water jacket portion and the second water jacket portion.
8. The assembly of paragraph 1, comprising
    an engine cylinder block including a plurality of cylinders;
    a corresponding plurality of injectors associated with the cylinders;
    and wherein
    the first water jacket portion includes injector port sections adjacent the injectors to facilitate heat transfer from the injectors to fluid in corresponding injector port sections of the first fluid channels;
    at least some of the connector fluid channels are situated near the injector port sections to carry heated fluid from the injector port sections to the second water jacket portion to facilitate further heat transfer from the injectors to the fluid.
9. The assembly of paragraph 1, comprising
    an engine cylinder block including a plurality of cylinders;
    and wherein
    the first water jacket portion is situated a first proximity to the engine cylinder block to facilitate a first amount of heat dissipation based on heat transfer from the engine cylinder block to fluid in the first fluid channels; and
    the second water jacket portion is situated a second proximity that is further from the engine cylinder block than the first proximity to facilitate a second, additional amount of heat dissipation based on heat transfer from the fluid in the second fluid channels to a material of the second water jacket portion.
10. The assembly of paragraph 1, wherein the first and second water jacket portions comprise aluminum.
11. The assembly of paragraph 1, wherein
    the first fluid channels are configured to direct fluid in a first direction along the first plane; and
    the second fluid channels are configured to direct fluid in a second, opposite direction along the second plane.
12. The assembly of paragraph 1, wherein
    the first water jacket portion includes an area that is situated where coolant may not readily flow from the area; and
    at least one of the connector fluid channels is situated near the area to carry coolant from the area to the second water jacket portion.
13. The assembly of paragraph 12, wherein the area is near at least one of an injector or an exhaust valve.
14. A vehicle comprising the assembly of any preceding numbered paragraph.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims.

We claim:
1. An assembly, comprising
    a first water jacket portion establishing a plurality of first fluid channels that are situated to facilitate fluid movement along at least a first plane;

a second water jacket portion situated near the first water jacket portion, the second water jacket portion establishing a plurality of second fluid channels that are situated to facilitate fluid movement along at least a second plane that is generally parallel to the first plane; and at least one connector portion establishing a plurality of connector fluid channels that are situated to facilitate fluid movement between at least one of the first fluid channels and at least one of the second fluid channels along a direction that is transverse to the first and second plane;

an inlet to the first water jacket portion on a first side of the first water jacket portion;

an outlet from the second water jacket portion on the first side of the first water jacket portion;

an engine cylinder block, wherein the first water jacket portion includes a cylinder block outlet for directing some fluid from the first fluid channels toward the engine cylinder block;

a vehicle cabin heater, wherein the outlet from the second water jacket portion directs the at least some of the fluid toward the vehicle cabin heater; and a flow control element that is selectively controllable to prioritize fluid flow through the cylinder block outlet when warming engine oil is desired and prioritize fluid flow through the outlet from the second water jacket portion when warming the vehicle cabin heater is desired;

wherein
the first fluid channels are configured to carry at least some of the fluid in a direction from the first side of the first water jacket portion toward a second, opposite side of the first water jacket portion;

the connector fluid channels are configured to carry the at least some of the fluid from the first fluid channels to the second fluid channels; and the second fluid channels are configured to carry the at least some of the fluid received from the connector fluid channels in another direction from the second side toward the first side and toward the outlet.

2. The assembly of claim 1, wherein the first and second water jacket portions are configured to be situated in a generally horizontal orientation and the connector fluid channels are configured to be situated in a generally vertical orientation.

3. The assembly of claim 1, comprising a reinforcing plate situated at least partially between the first water jacket portion and the second water jacket portion.

4. The assembly of claim 1, wherein
the engine cylinder block includes a plurality of cylinders;
there are a corresponding plurality of injectors associated with the cylinders;
the first water jacket portion includes injector port sections adjacent the injectors to facilitate heat transfer from the injectors to fluid in corresponding injector port sections of the first fluid channels; and
at least some of the connector fluid channels are situated near the injector port sections to carry heated fluid from the injector port sections to the second water jacket portion to facilitate further heat transfer from the injectors to the fluid.

5. The assembly of claim 1, wherein
the engine cylinder block includes a plurality of cylinders;
the first water jacket portion is situated a first proximity to the engine cylinder block to facilitate a first amount of heat dissipation based on heat transfer from the engine cylinder block to fluid in the first fluid channels; and
the second water jacket portion is situated a second proximity that is further from the engine cylinder block than the first proximity to facilitate a second, additional amount of heat dissipation based on heat transfer from the fluid in the second fluid channels to a material of the second water jacket portion.

6. The assembly of claim 1, wherein the first and second water jacket portions comprise aluminum.

7. The assembly of claim 1, wherein
the first fluid channels are configured to direct fluid in a first direction along the first plane; and
the second fluid channels are configured to direct fluid in a second, opposite direction along the second plane.

8. The assembly of claim 1, wherein
the first water jacket portion includes an area that is situated where coolant may not readily flow from the area; and
at least one of the connector fluid channels is situated near the area to carry coolant from the area to the second water jacket portion.

9. The assembly of claim 8, wherein the area is near at least one of an injector or an exhaust valve.

10. A cooling system comprising the assembly of claim 1.

11. A cooling system for an internal combustion engine comprising the assembly of claim 1.

12. A cooling system for a vehicle, comprising the assembly of claim 1.

13. A vehicle comprising the assembly of claim 1.

* * * * *